US006147991A

United States Patent [19]
Rogers

[11] Patent Number: 6,147,991
[45] Date of Patent: Nov. 14, 2000

[54] SCALABLE HIGH SPEED PACKET SWITCH USING PACKET DIVERSION THROUGH DEDICATED CHANNELS

[75] Inventor: Steven Rogers, Tuftonboro, N.H.

[73] Assignee: Video Network Communications, Inc., Portsmouth, N.H.

[21] Appl. No.: 08/924,817

[22] Filed: Sep. 5, 1997

[51] Int. Cl.[7] .................................................. H04L 12/28
[52] U.S. Cl. ............................................................. 370/389
[58] Field of Search .................................... 370/383, 389, 370/395, 397, 398, 414, 416

[56] References Cited

U.S. PATENT DOCUMENTS

| | | |
|---|---|---|
| Re. 34,755 | 10/1994 | Eng et al. . |
| Re. 34,811 | 12/1994 | Eng et al. . |
| 4,156,907 | 5/1979 | Rawlings et al. . |
| 4,751,697 | 6/1988 | Hunter et al. . |
| 4,796,254 | 1/1989 | van Baardwijk et al. . |
| 4,821,258 | 4/1989 | Fraser . |
| 4,821,259 | 4/1989 | DeBruler et al. . |
| 4,870,641 | 9/1989 | Pattavina . |
| 4,876,681 | 10/1989 | Hagiwara et al. . |
| 4,955,016 | 9/1990 | Eng et al. . |
| 4,955,017 | 9/1990 | Eng et al. . |
| 5,014,266 | 5/1991 | Bales et al. . |
| 5,051,982 | 9/1991 | Brown et al. . |
| 5,081,655 | 1/1992 | Long . |
| 5,097,466 | 3/1992 | Kammerl . |
| 5,103,444 | 4/1992 | Leung et al. . |
| 5,113,499 | 5/1992 | Ankney et al. . |
| 5,115,426 | 5/1992 | Spanke . |
| 5,157,654 | 10/1992 | Cisneros ..................................... 370/60 |
| 5,170,473 | 12/1992 | Ishida . |
| 5,172,371 | 12/1992 | Eng et al. . |
| 5,235,595 | 8/1993 | O'Dowd . |
| 5,253,251 | 10/1993 | Armaki . |
| 5,355,372 | 10/1994 | Sengupta et al. . |
| 5,367,520 | 11/1994 | Cordell . |
| 5,388,217 | 2/1995 | Benzschawel et al. . |
| 5,432,783 | 7/1995 | Ahmed et al. . |
| 5,432,785 | 7/1995 | Ahmed et al. . |
| 5,537,142 | 7/1996 | Fenouil . |
| 5,539,729 | 7/1996 | Bodnar . |
| 5,544,160 | 8/1996 | Cloonan et al. . |
| 5,561,669 | 10/1996 | Lenney et al. . |
| 5,594,725 | 1/1997 | Tischler et al. . |
| 5,724,351 | 3/1998 | Chao et al. .............................. 370/295 |
| 5,802,052 | 9/1998 | Venkataraman ......................... 370/388 |

FOREIGN PATENT DOCUMENTS 0 239 908 A2   3/1986   European Pat. Off. .

OTHER PUBLICATIONS

M. Kumar, et al., Performance Enhancement in Buffered Delta Networks Using Crossbar Switches and Multiple Links, *Journal of Parallel and Distributed Computing*, vol. 1, No. 1, Aug. 1, 1984, pp. 81–103.

*Primary Examiner*—Huy D. Vu
*Assistant Examiner*—Alexander Boakye
*Attorney, Agent, or Firm*—Banner & Witcoff, Ltd.

[57] ABSTRACT

A scalable high-speed packet switching device includes a packet switch with ports, a crosspoint matrix, and a plurality of subswitches, one for each port of the packet switch. A processor in the packet switch detects a high level of traffic between two ports and causes the subswitches and crosspoint matrix to divert packets away from the packet switch and through a dedicated channel in the crosspoint matrix.

24 Claims, 6 Drawing Sheets

SCALABLE HIGH SPEED PACKET SWITCH USING PACKET DIVERSION THROUGH DEDICATED CHANNELS

BACKGROUND OF THE INVENTION

1. Technical Field

This invention relates generally to packet switching devices, and more particularly to a packet switch which can be scaled up to handle a large number of ports without a corresponding decrease in performance. The invention provides a technique for detecting high traffic levels between two ports and diverting packets between such ports through a dedicated channel.

2. Related Information

Packet switching techniques are conventionally used to transmit various types of digital data such as digitized voice, computer data, and video signals. Data (e.g., a telephone voice signal) is broken up into packets each of a specified size, wherein each packet typically includes, in addition to the digital data, a header indicating a destination address to which the packet should be sent. A packet switching network made up of packet switches can be used to route packets to their respective destinations without delay. See, for example, U.S. Pat. No. 5,544,160 to Cloonan et al., entitled "Terabit per Second Packet Switch".

Packet switches may also be used in smaller communication networks to route data between devices. As one example, an interoffice videoconferencing system may have a requirement to selectively transmit digitized video and audio information to one or more recipients through a centralized switch. A packet switch can be designed to handle such digitized information, so that packets comprising a video signal from one video conference participant are switched to all participants of the video conference.

As the size of packet switching networks has grown, the complexity and processing requirements of packet switching devices has increased. For example, the number of ports required for a particular packet switch has increased, requiring faster processors to handle the increased traffic.

Conventional packet switches (i.e., devices which route packets of digital data between two sets of ports) are well known. FIG. 1 shows in simplified form a conventional packet switch architecture including a CPU 101, a routing table 102, buffer memory 103, data bus 104, and packet interfaces 105 through 111 each corresponding to a port. Packets arrive at a port (e.g., port 1) and are routed to a destination port (e.g., port 2) based on information contained in packet headers.

Most packet switches rely on fast software to route packets. As shown in FIG. 1, for example, incoming packets are received by packet interfaces 105 through 111 and interpreted by CPU 101. CPU 101 temporarily stores incoming packets into buffer memory 103 and examines each packet header to determine which port the packet should be routed to for output. This examination usually involves searching a look-up table of addresses versus ports stored in routing table 102. The table includes a list of addresses and ports which are most advantageous to route the packet for a given address. Following the look-up operation, the packet is placed in the correct packet interface and sent to the destination port. Special messages can be transmitted to the packet switch to change routing table 102, thus changing the network routing parameters.

One problem with the conventional architecture of FIG. 1 is that it can take a long time to sort through routing table 102. As a network grows, the number of potential distant packet addresses grows. In fact, it may be that the packet routing table can be billions of addresses long, severely bogging down CPU 101.

The time it takes to receive and store packets while the routing process is underway will limit the number of ports that a packet switch can support. It also limits the number of packets that can be routed per second. A given CPU has a finite processor bandwidth Z. This bandwidth will allow the CPU to successfully route X packets per second. Each packet interface has a bandwidth or maximum packet speed Y in packets per second. Thus, the number of ports N that can be successfully serviced by this type of packet switch is limited to $N(max)=X/Y$.

A packet switch based on the architecture of FIG. 1 can only be scaled as far as the CPU bandwidth is scaled. This is difficult, as there is a limit on the processing bandwidth of a single CPU. Consequently, packet switches based on the general architecture shown in FIG. 1 cannot be easily scaled to support a large number of ports or addresses.

SUMMARY OF THE INVENTION

The present invention overcomes the aforementioned problems by providing a scalable packet switch which can be though of as a hybrid between a "connectionless" switch and a "connectioned" switch. The architecture can scale to a much larger number of ports, and is not limited by the bandwidth of a single CPU. The scalable packet switch, in response to detecting a high traffic rate between two node addresses (and hence between switch ports), creates a dedicated path between the ports for packets between those nodes, thus diverting the packets away from a bottleneck in the switch.

In one embodiment, the packet switch includes a conventional packet switch which is augmented with an additional subswitch per port and a crosspoint matrix. Each subswitch is designed to switch packets to one of only two possible destinations: the conventional packet switch or to the crosspoint matrix. By limiting each subswitch to only three ports, the processor bandwidth can be fully used, thus allowing the packet per second rate per port to be absolutely maximize.

The new scalable switch takes advantage of a well-known property of packet communications: the majority of the packets sent through a switch are sent as part of a stream of packets. In other words, an application using packet transmission will usually engage in a session with another location served by a particular port. This session will continue for some time, with most of the traffic being transmitted between the two distant ends. When the session is over, the two parties will then move on to other sessions, between other distant parties. During each session, however, there is little packet traffic that is not transmitted between the two parties and thus between two particular ports.

In accordance with the invention, a dedicated connection is provided to transmit certain packets directly between ports (avoiding the main packet switch) while still allowing other packets to travel through the main packet switch.

Additional features and advantages of the present invention will become apparent through the following detailed description, the figures, and the appended claims.

DETAILED DESCRIPTION OF THE PREFERRED EMBODIMENTS

Figure 1:
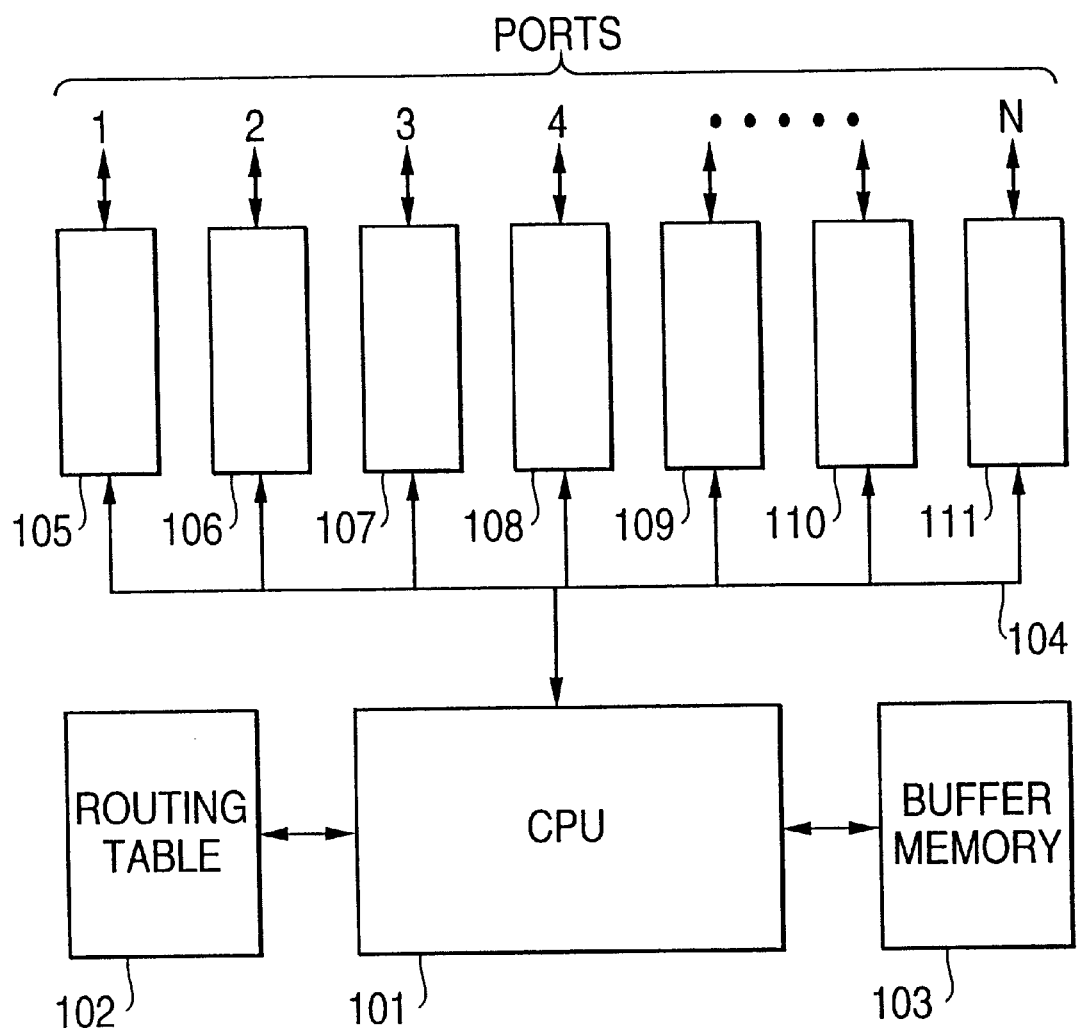
FIG. 1 shows a conventional packet switch architecture which uses a CPU to look up address/port entries in a routing table.
Figure 2:
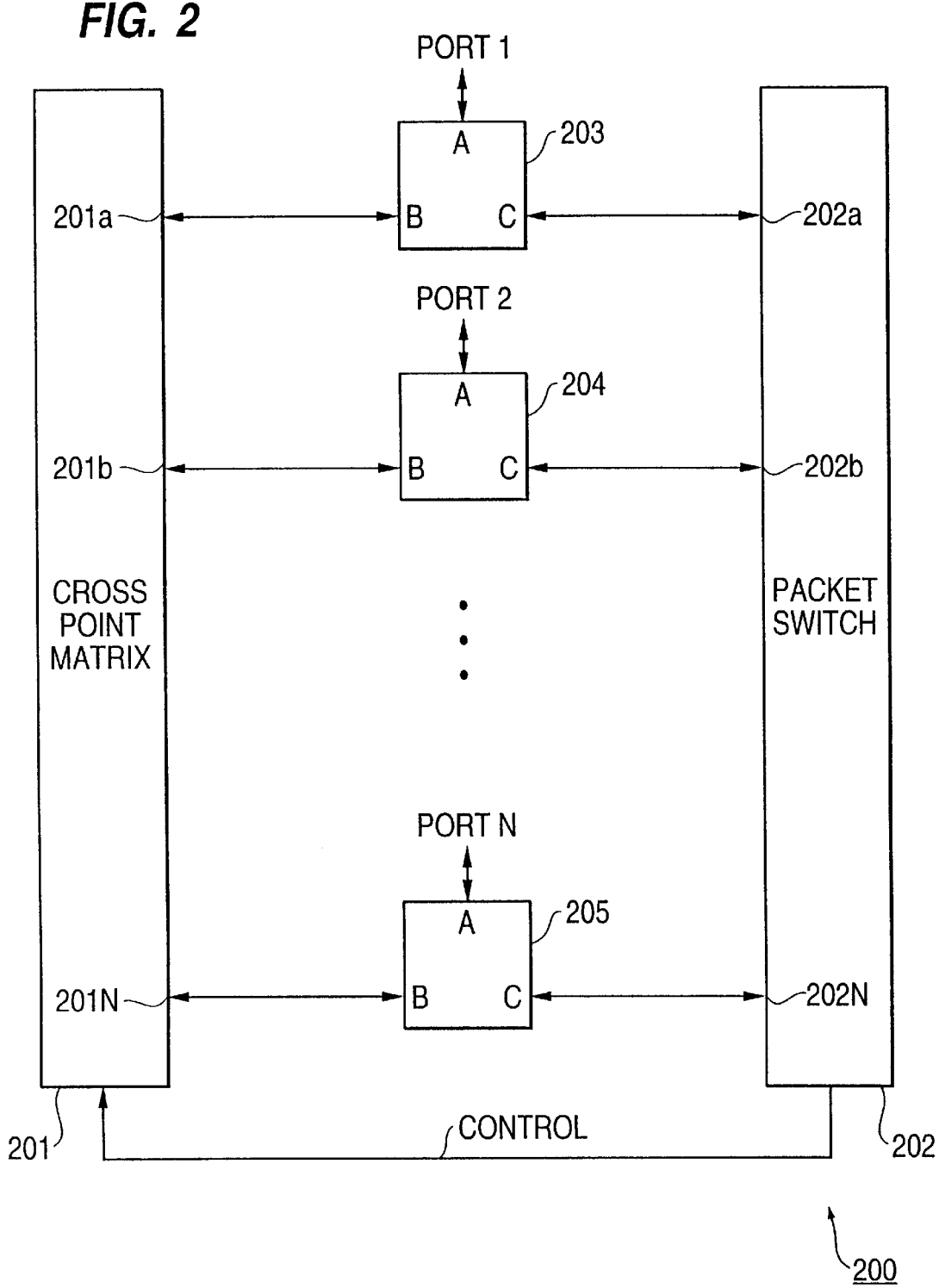
FIG. 2 shows a packet switch in accordance with one embodiment of the present invention, including a crosspoint matrix 201, a plurality of packet subswitches 203 through 205 and a main packet switch 202.

FIG. 2 shows a packet switch which employs various principles of the present invention. Packet switch 200 includes a conventional packet switch 202 which is augmented with a crosspoint matrix 201 and an additional subswitch (203 through 205) per port. In contrast to FIG. 1, where switch ports are arranged across the top of the figure, switch ports in FIG. 2 are arranged down the middle of the figure.

In the inventive architecture of FIG. 2, each sub-switch is designed to switch packets with only two possible destinations. A packet arriving at a port (e.g., PORT 1) can either be routed to the main packet switch 202 or to crosspoint matrix 201. In accordance with the invention, packets flowing between high-traffic ports are diverted through crosspoint matrix 201 using a dedicated path instead of going through packet switch 200. Each sub-switch 203 through 205 may comprise a small standard packet switch with N=3 ports. The operation of FIG. 2 is explained in more detail below.

Figure 3:
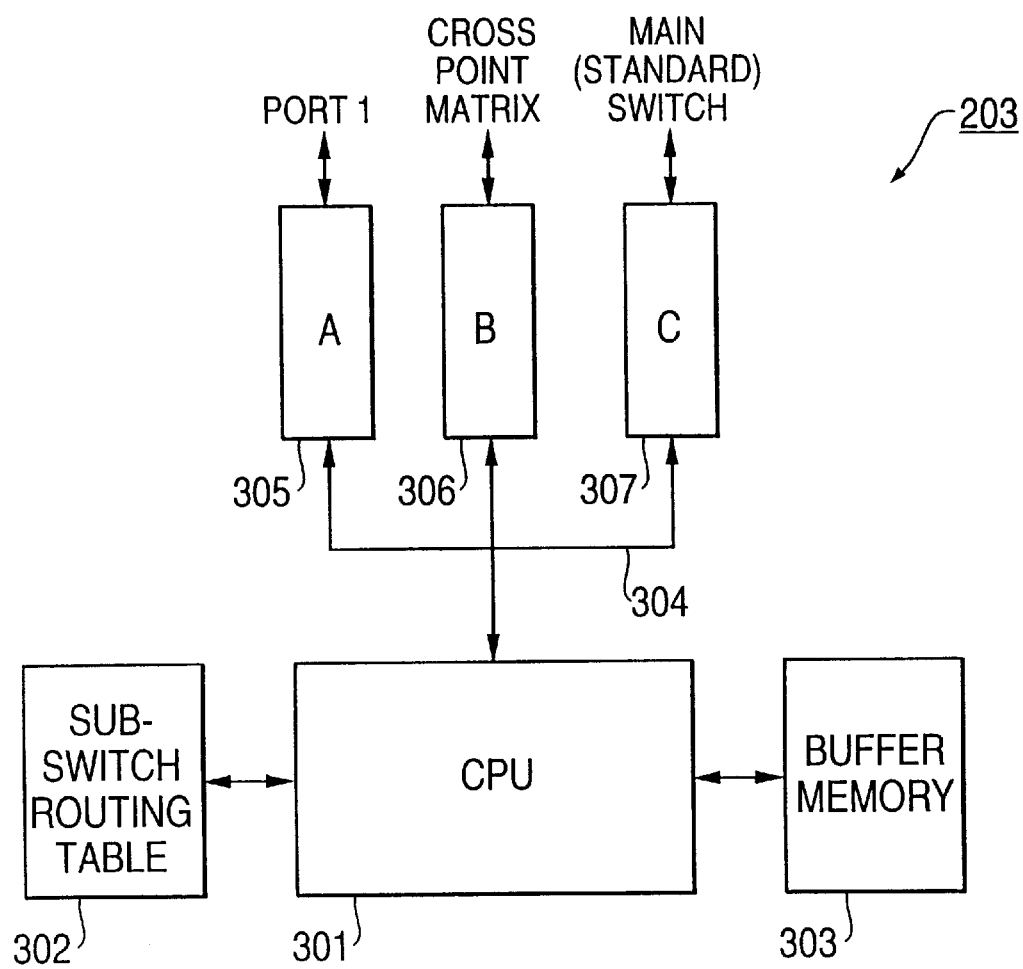
FIG. 3 shows one embodiment of a packet subswitch of the type used in the system of FIG. 2.

FIG. 3 shows one possible embodiment for subswitch 203 of FIG. 2. By limiting each subswitch to exactly three ports, the processor bandwidth can be fully utilized, thus allowing the packet per second rate per port to be absolutely maxims As shown in FIG. 3, each subswitch includes a processor such as a CPU 301, a subswitch routing table 302, a buffer memory 303, data bus 304, and three port interfaces 305 through 307. A first port interface 305 provides the external packet switch port connection (i.e., this replaces port interface 105 of FIG. 1). A second port interface 306 couples the CPU to the cross point matrix. A third port interface 307 couples the CPU to the main packet switch (i.e., packet switch 202 of FIG. 2).

Subswitch routing table 302 and buffer memory 303 may reside in different areas within a single computer memory. CPU 301 may comprise any of various commercially available processors, such as 8-bit or 16-bit processors. Alternatively, CPU 301 may comprise a portion of an application-specific integrated circuit, or may be constructed of other well known logic functional units. The essential function of CPU 301 is to route packets between PORT 1 and the crosspoint matrix or the main packet switch based on a configuration command.

Normally, subswitch 203 merely transfers incoming packets from PORT 1 (through interface 305) to main packet switch 202 (through interface 307) and vice versa. However, subswitch 203 can be commanded to create an entry in subswitch routing table 302 such that all packets destined for a particular address are instead diverted to crosspoint matrix 201 (via port interface 306) and vice versa. Commands to reconfigure subswitch 203 may be provided either through crosspoint matrix 201 or from packet switch 202 via port interface 307. The subswitch may be commanded to divert packets destined for a particular logical address, physical address, node address, port, or any other designation.

The inventive packet switch relies on the fact that when an application such as video conferencing transmits information between 2 locations, a session is created, causing a large number of packets to flow during the session. This session will continue for some time, with most of the traffic being transmitted between the two distant ends. When the session is over, the two parties will then move on to other sessions, between other distant parties. During the session, there is very little packet traffic that is not transmitted between the two parties.

One example of such a session is a multimedia communications session. If a user is sending a series of video or graphics images, then the data will exhibit a high packet volume directed at the distant end with little or no packets sent anywhere else. During this session, a "virtual" connection is established between the two parties.

Figure 4:
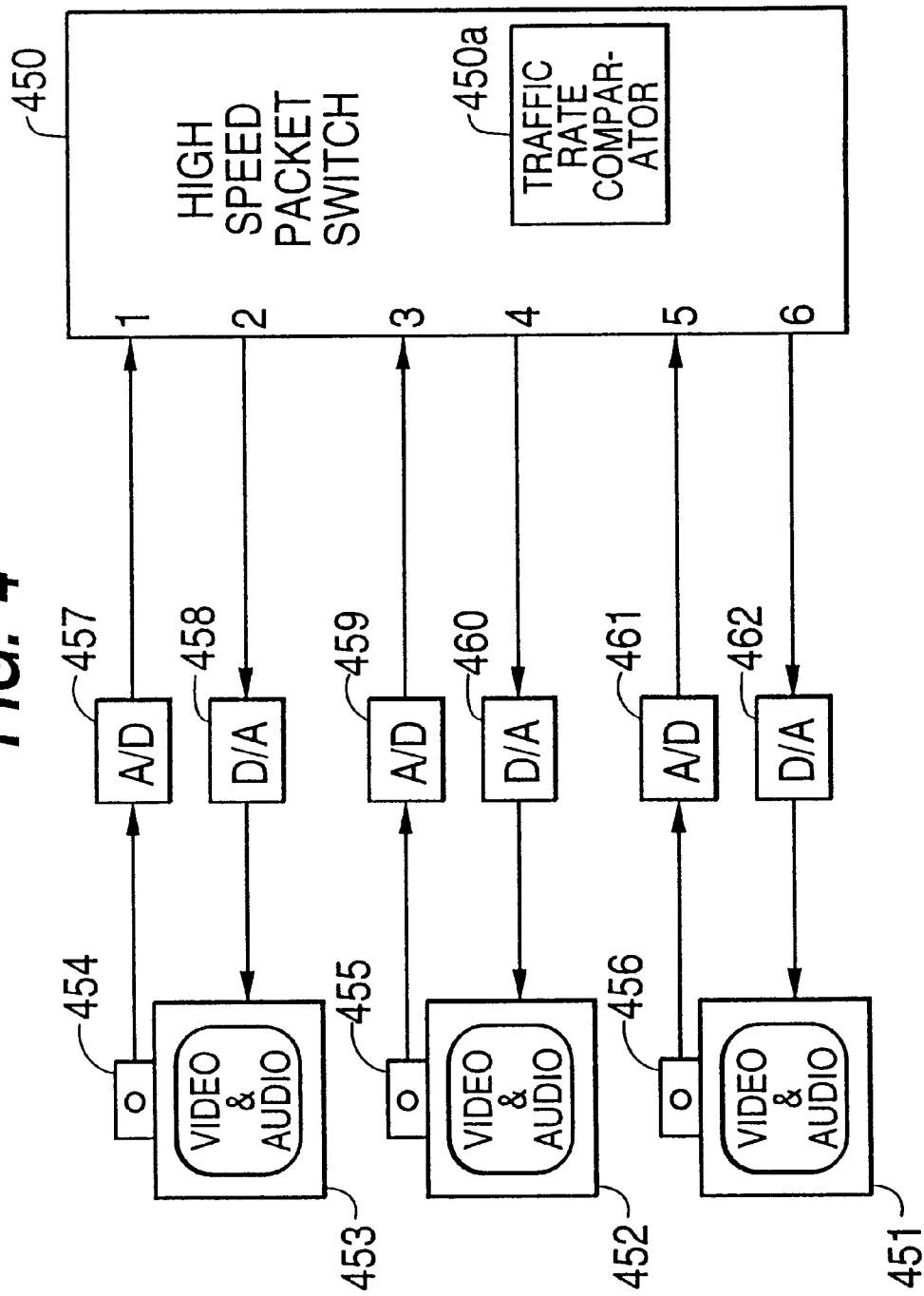
FIG. 4 shows a video conferencing system employing a high speed packet switch to route video and audio packets among conference participants.

FIG. 4 shows a videoconferencing system using a high speed packet switch according to various aspects of the invention. High speed packet switch 450 includes six ports each of which is coupled through appropriate digital conversion hardware (e.g., A/Ds and D/As 457 through 462) to video conferencing stations 451, 452 and 453. Such connections may be made over a LAN, telephone wires, or other suitable media. High speed packet switch 450 also includes a traffic rate comparator 450a which may be implemented in hardware, software, or a combination of the two. In one embodiment, traffic rate comparator compares traffic levels between addresses flowing through the switch, determines whether a threshold has been exceeded, and causes packets to be diverted through a crosspoint matrix when traffic levels are exceeded between two ports corresponding to the high-traffic addresses.

Each video conferencing station may comprise a personal computer with a color display, audio equipment including a microphone and speakers, and a video camera such as camera 454. It will be appreciated that other components may also be included in such a video conferencing system to provide various features such as camera control, filtering, conference bridging/mixing, etc.

Video and audio information from each conference station is digitized and transmitted to high speed packet switch 450, which is constructed in accordance with the architecture of FIGS. 2 and 3. Packet switch 450 examines each incoming packet and routes the packet to its destination port. For example, if conference station 453 is conducting a video teleconference with conference station 451, packet switch 450 routes data packets containing video and audio information from station 453 (received on port 1) to station 451 (through port 6). Similarly, packet switch 450 routes data packets containing video and audio information from station 451 (received on port 5) to station 453 (through port 2). It will be appreciated that bi-directional ports may be used instead of unidirectional ports.

In contrast to conventional systems, however, packet switch 450 detects the condition that a large traffic volume is flowing between the respective ports, and reconfigures subswitches within the packet switch to transmit data through the crosspoint matrix rather than looking up each address in the main packet switch. Accordingly, increased traffic volume can be handled.

Referring again to FIG. 2, processing requirements on the main packet switch 202 are greatly reduced by diverting packets destined for a particular port through crosspoint matrix 201. Crosspoint matrix 201, which may comprise a digital crosspoint matrix, can establish a direct link between two of the sub-switch ports in the overall switch. This matrix can be controlled by the CPU in main packet switch 202 over a control line CONTROL. When main packet switch 202 detects a high traffic rate between two ports, it controls crosspoint matrix 201 to establish a direct connection between the appropriate subswitches. Main switch 202 informs, through special control packets or via direct control signals, the subswitches to route the connected traffic for those addresses directly through the crosspoint direct connection instead of through main switch 202. In the case where data is not part of the "virtual circuit", it is directed to the main packet switch and routed in the normal manner.

Crosspoint matrix 201 may comprise any of various types of crosspoint switches which provide a dedicated path between two designated ports. Such crosspoint switches are well known an no further elaboration is needed. Packet switch 202 may comprise any of various types of packet switches which route incoming packets to one or more destination ports based on address information in a packet header (e.g., see FIG. 1). In contrast to conventional packet switches, however, packet switch 202 may include a CPU which detects a condition that a large number of packets are flowing between two addresses (or ports) and generates a signal on control line CONTROL to configure crosspoint matrix 201 to provide dedicated paths between two corresponding subswitches. Additionally, the corresponding subswitches are commanded to divert incoming and outgoing packets for the particular addresses through crosspoint matrix 201 rather than through packet switch 200. Each subswitch can accomplish this function by creating an entry in its corresponding subswitch routing table to reflect new port assignments.

Diverting traffic through crosspoint matrix 201 offloads main packet switch 202 from making repetitive packet routing. In some systems, such as multi-media communications systems, 90% or more of the packet traffic would be associated with these virtual connections. In this case the crosspoint matrix acts as a high-speed accelerator. In many systems of this kind the connection-oriented packet traffic is 99.99% or more of the total.

Figure 5:
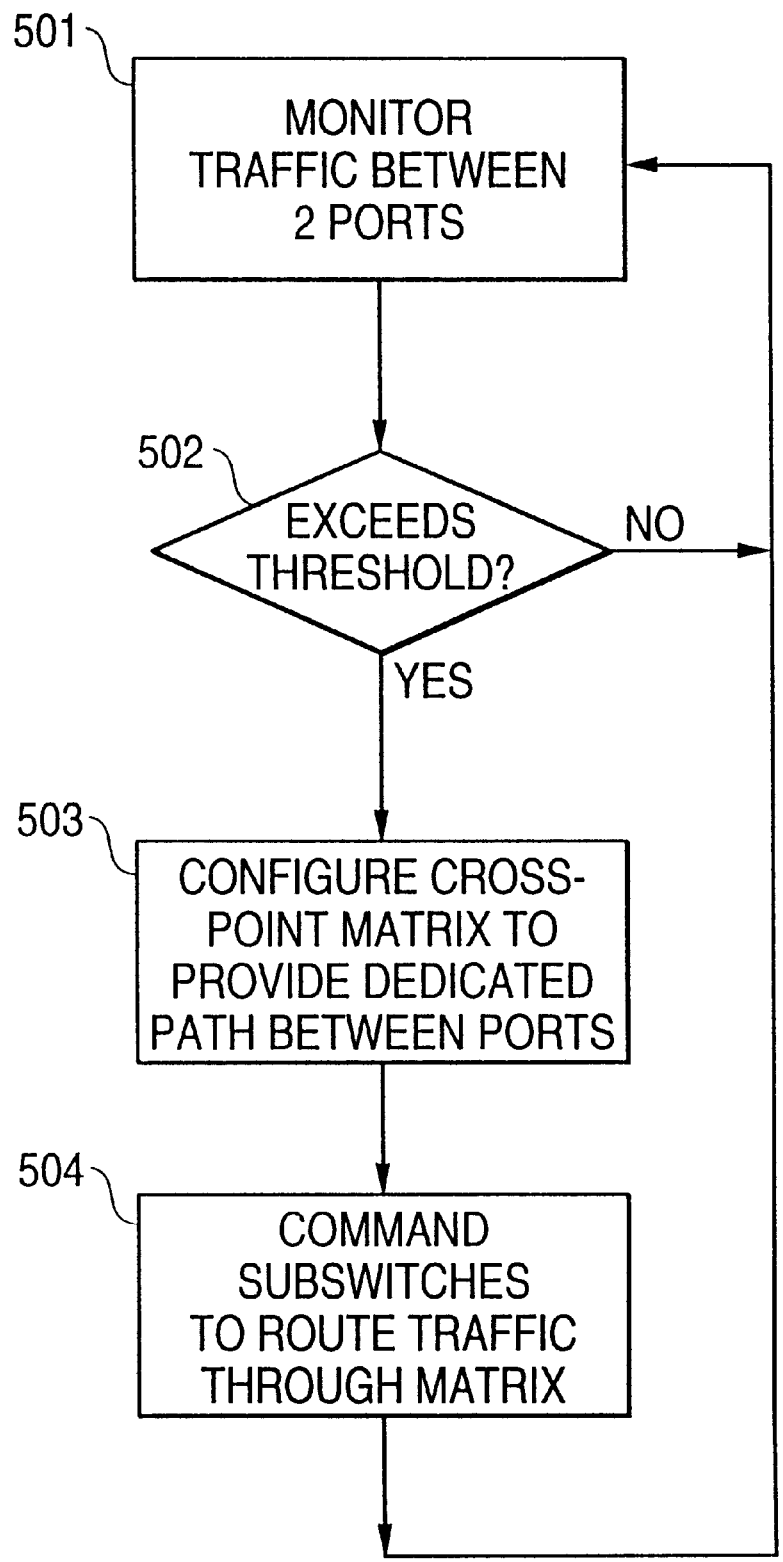
FIG. 5 shows a method for dynamically reconfiguring a crosspoint matrix to provide a dedicated path between high-traffic ports.

FIG. 5 shows a method for detecting traffic patterns and reconfiguring the packet switch according to one aspect of the present invention. The method may be implemented, for example, in a conventional packet switch by reprogramming the CPU to monitor traffic and issue commands accordingly. Alternatively, separate circuitry can be provided to detect traffic patterns and configure the crosspoint matrix and port subswitches. It may also be possible to implement the traffic monitoring function directly in the subswitches, such that the subswitches themselves detect traffic patterns and issue commands to reconfigure the crosspoint matrix and subswitch routing tables. All of these possibilities are well within the scope of the present invention.

Beginning with step 501, the traffic level between pairs of addresses or ports is monitored. This may be accomplished in any of various ways, such as creating an entry for each pair of source/destination addresses and incrementing a packet counter for each packet which passes through the pair corresponding to the entry. Once the address has been established, a port number can be established or determined.

In step 502, a test is made to determine whether the traffic level between the two ports exceeds a threshold. The threshold may be statically created or may be dynamically reconfigured depending on the circumstances (i.e., select the highest 10 traffic ports; select all ports which exceed a predetermined limit; or use statistical sampling techniques). If the threshold has not been exceeded, the monitoring continues in step 501.

If a traffic threshold has been exceeded, then in step 503 the crosspoint matrix is reconfigured to create a dedicated path between the two ports for the specified addresses. Additionally, in step 504, the subswitches associated with each port are commanded to divert traffic for the specified address. In one embodiment, when traffic levels fall below a specified minimum, the diversion of packets may be reversed.

Suppose that three nodes in a system are communicating (nodes 1, 2, and 3). Assume that nodes 1 and 2 are conducting a video conference or other multimedia session which involves a large quantity of traffic, and node 3 only periodically transmits a message to the other two nodes. In accordance with one aspect of the invention, a large traffic volume between nodes 1 and 2 would be detected, and a dedicated path would be established for communicating between ports for those nodes by commanding two subswitches corresponding to the ports to divert packets going to or coming and the specified nodes through the crosspoint matrix. However, packets going to or coming from node 3 would not be diverted through the crosspoint matrix, and would instead travel through the packet switch according to conventional packet switching techniques.

Figure 6:
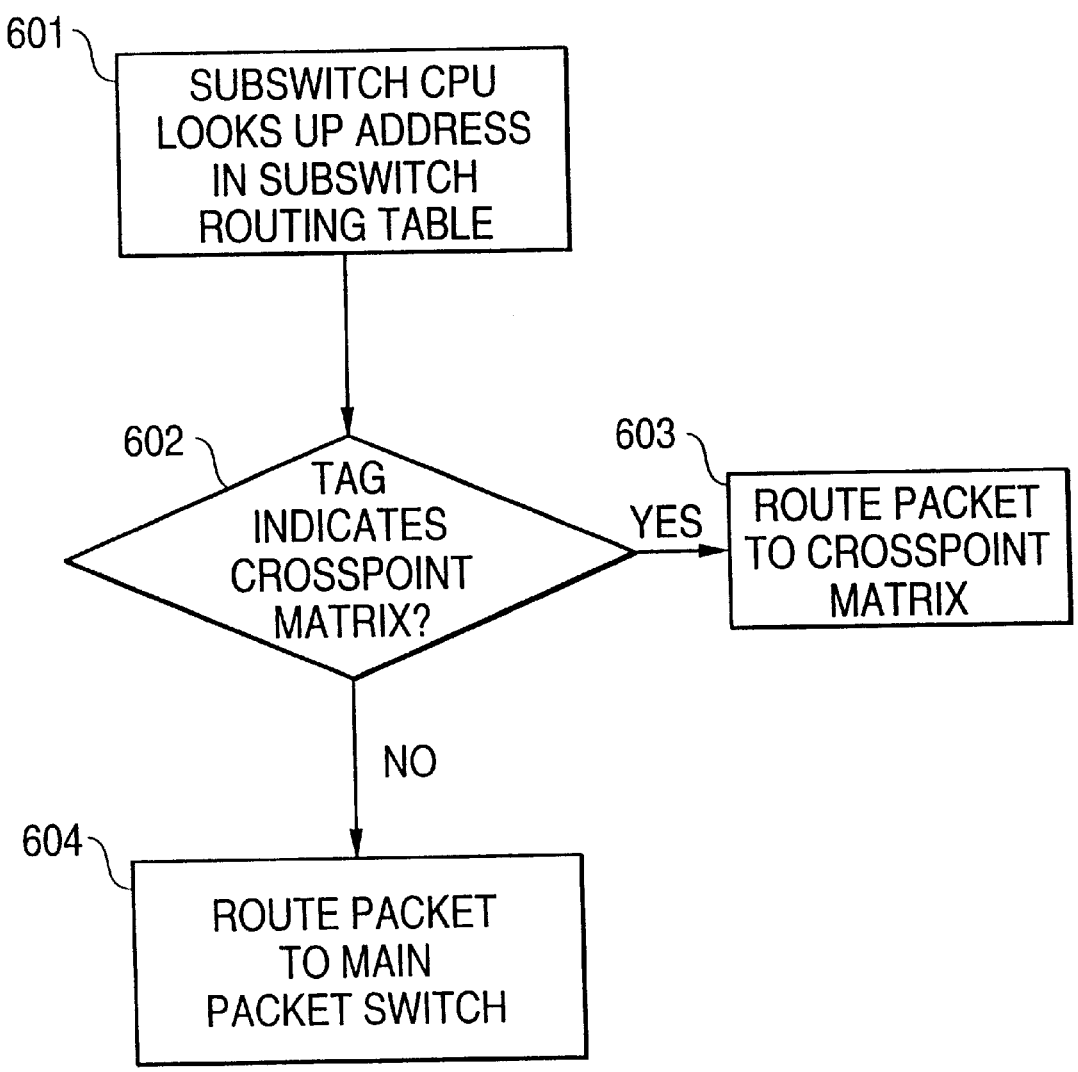
FIG. 6 shows a method for routing packets at each subswitch.

FIG. 6 shows a method for routing packets at each subswitch. Beginning in step 601, each subswitch processor looks up an address extracted from an incoming packet header in the local subswitch routing table. In step 602, if a tag associated with that address indicates that the packet should be routed to the crosspoint matrix, then in step 603 the packet is routed to the crosspoint matrix and hence directly to another subswitch. If, on the other hand, the tag or port assignment indicates that the packet should not be routed to the crosspoint matrix, then in step 604 the subswitch routes the packet to the main packet switch where it is processed normally.

A switch constructed in accordance with the inventive principles is scalable since each sub-switch is associated with a port (i.e., N ports requires N sub-switches). The crosspoint matrix also grows with the number of ports and can be implemented in digital hardware. Although it scales in complexity as N2, it is feasible to build large crosspoint matrix devices of 100×100 in a single integrated circuit.

There is no speed penalty in the sub-switch as the number of ports increases. For virtual circuit data the latency through an input subswitch, to the output port subswitch, is the same for a small number of ports as well as for a large number of ports. In cases where the main packet switch is off-loaded by 90% the size of the over-all switch can now grow by a factor of ten because the main packet switch has one tenth the traffic it had before. If the connection oriented traffic is 99% of the total, then the scalable switch can grow to one hundred times the size of a standard packet switch, etc.

The result of implementing a packet switch in accordance with the present invention is that with the same CPU type a switch can be implemented that has many more connection ports. It can scale, depending on the percentage of traffic that is connection-oriented, to ten or even one hundred or more times the number of ports on a standard switch.

Another advantage of the scalable switch design is that it reduces the average latency through the switch. At first this would not be the case, since for a single isolated packet the route through the scalable switch would have to go through three switches, the main switch and two sub-switches. However, for connection oriented packets the latency delay in the main switch can very large, depending on the search algorithm. With the scalable switch the latency is limited to the latency of two sub-switches. In addition, the two sub-switches have only to make a simple two-way routing decision. In fact, the subswitch, on the input side, need only route packets by comparing them to a single destination address. That address is the distant destination in the virtual connection. All other packets go to the main switch.

The one-address routing scheme lends itself to a common speed-up technique called "cut-through" addressing. With cut-through routing, the subswitch looks for the address field as the packet is being received and begins transmitting the packet to the proper port even before the whole packet is received. Because only one address is searched for, it is possible to build a very efficient cut-through switch. This minimizes the total latency even further.

Finally, on the output sub-switch, the output packet from the main switch or from the cross-point matrix is always routed to the output port. These packets are assumed to be targeted for the distant connection. In this case, the outbound packet can be very quickly routed, using an almost zero latency cut-through technique. The only reason for buffering the outbound packet is to prevent a collision from the other outbound route. For example, if a packet is arriving to the output subswitch from the crosspoint matrix at the same time as a packet from the main switch, then the second packet must be buffered while the first packet is forwarded.

The advantages of the scalable switch are many. First, the number of switch ports possible with a given CPU bandwidth is greatly increased. Conversely, the data rate for each port in the switch can be significantly increased. Finally, the latency in the switch, on average, can be significantly reduced for the connection-oriented traffic.

It is apparent that many modifications and variations of the present invention are possible, and references to specific values are by example only. Switch ports, for example, can be either unidirectional or bi directional. Various functions can be implemented in either hardware or software or a combination of both.

Reference numerals in the appended method claims identifying steps are for convenience only and are not intended to imply a necessary ordering of the steps. It is apparent that the method steps of the invention may be practiced in a different ordered sequence from that illustrated without departing from the scope of the invention. It is, therefore, to be understood that within the scope of the appended claims the invention may be practiced otherwise than as specifically described.

What is claimed is:

1. An improved packet switching device, comprising:
   a packet switch comprising a plurality of switch ports, wherein the packet switch receives packets at one of the plurality of switch ports, determines a destination switch port for each packet by comparing an address in each packet with packet switch routing information, and routes each packet to the destination switch port;
   a crosspoint matrix comprising a plurality of matrix ports, wherein the crosspoint matrix is configurable to provide direct paths between any two of the matrix ports; and
   a plurality of subswitches, each coupled to the packet switch and to the crosspoint matrix;
   wherein each subswitch is configurable to divert certain packets away from the packet switch to the crosspoint matrix and to allow other packets to pass through to the packet switch.

2. The improved packet switching device of claim 1, wherein each subswitch comprises a first subswitch port at which packets are received or transmitted; a second subswitch port coupled to the crosspoint matrix; a third subswitch port coupled to one of the plurality of switch ports of the packet switch; a processor and a subswitch routing table; and wherein the processor compares an address of each packet arriving at the subswitch with subswitch routing information stored in the subswitch routing table and routes packets having an address corresponding to the crosspoint matrix to the crosspoint matrix and routes packets having an address corresponding to the packet switch to the packet switch.

3. The improved packet switching device of claim 2, wherein the processor is responsive to a subswitch configuration command to change the subswitch routing information stored in the subswitch routing table.

4. The improved packet switching device of claim 3, wherein the processor receives the subswitch configuration command from the packet switch in response to a traffic rate comparison between two of the plurality of packet switch ports.

5. The improved packet switching device of claim 3, wherein the processor receives the subswitch configuration command from the crosspoint matrix.

6. The improved packet switching device of claim 1, wherein each of the switch ports of the packet switch are bi directional.

7. The improved packet switching device of claim 1, wherein the packet switch performs a traffic rate comparison for addresses extracted from packet headers received at the packet switch, and, responsive to determining that a traffic rate between two addresses exceeds a threshold, transmitting a configuration command to two of the plurality of subswitches each corresponding to one of the packet switch ports which exhibits the traffic rate which exceeds the threshold to divert subsequent packets containing the two addresses through the crosspoint matrix.

8. The improved packet switching device of claim 7, wherein the packet switch further issues a command to the crosspoint matrix to set up a dedicated path between two of the plurality of subswitches.

9. The improved packet switching device of claim 1, wherein the packets contain packetized video and audio information corresponding to a video teleconference.

10. A system including the improved packet switching device of claim 2 and a plurality of video conference stations each of which transmits and receives packetized video information for a conference participant, wherein each conference station is coupled to at least one of the first subswitch ports, and wherein during a video conference between two of the video conference stations, the improved packet switching device detects a high traffic rate between the two video conference stations and causes subsequent packets between the two video conference stations to be diverted through the crosspoint switch.

11. An improved packet switching device, comprising:
    a packet switch comprising a plurality of switch ports each including a port interface for transmitting and receiving packets, a packet switch memory including routing information which associates packet addresses with switch ports, and a processor which extracts packet addresses from packets received at the switch ports, looks up each packet address in the packet switch memory, determines a destination switch port for each packet address on the basis of the looked up packet address, and transmits each packet received at the switch ports to a respective destination switch port;

a crosspoint matrix including a plurality of matrix ports, wherein the crosspoint matrix is configurable to provide direct paths between any two of the matrix ports; and a plurality of subswitches, each subswitch comprising a first port at which packets are received or transmitted, a second subswitch port coupled to one of the plurality of matrix ports of the crosspoint matrix, a third subswitch port coupled to one of the plurality of switch ports of the packet switch, a subswitch routing memory which associates packet addresses with either the second subswitch port or the third subswitch port, and a processor which extracts addresses from packets received at the first subswitch port, compares the extracted addresses received from the first subswitch port with packet addresses in the subswitch routing memory, and transmits packets received from the first subswitch port to the second subswitch port for packets having extracted addresses associated with the second subswitch port in the subswitch routing memory and transmits packets received from the first subswitch port to the third subswitch port for packets having extracted addresses associated with the third subswitch port in the subswitch routing memory.

12. The improved switching device of claim 11, wherein the packet switch identifies high traffic levels between two of the packet switch ports and, in response thereto, causes the crosspoint matrix to provide a dedicated path between two of the plurality of subswitches and causes the two subswitches to divert subsequent packets away from the packet switch and through the dedicated path in the crosspoint matrix.

13. The improved switching device of claim 12, wherein the packet switch compares a traffic rate between two packet addresses extracted from packets flowing between two of the plurality of switch ports with a threshold.

14. The improved switching device of claim 11, further comprising a traffic comparator circuit which, in response to determining that a high traffic rate exists between two of the packet switch ports, configures the crosspoint matrix to provide a dedicated path between two of the plurality of subswitches.

15. The improved switching device of claim 14, wherein the traffic comparator circuit configures the two subswitches to divert packets having an address corresponding to the high traffic rate through the dedicated path of the crosspoint matrix.

16. A method of improving performance in a packet switching device having a plurality of device ports through which packets are switched, the method comprising the steps of:

(1) detecting a condition that a high traffic rate exists between two of the plurality of device ports and through a packet switch coupled to the device ports;

(2) in response to detecting the high traffic rate, providing a dedicated path which diverts packets having addresses associated with the high traffic rate away from the packet switch, wherein such packets are routed to their destination through the dedicated path instead of through the packet switch; and (3) continuing to route packets which do not have addresses associated with the high traffic rate through the plurality of device ports and the packet switch.

17. The method of claim 16, wherein step (2) comprises the step of configuring a crosspoint matrix, and two subswitches coupled between the crosspoint matrix and to two of the device ports, to divert packets through the subswitches to the crosspoint matrix.

18. The method of claim 17, wherein step (2) comprises the step of using a processor and a subswitch routing table in each of the two subswitches to divert the packets.

19. The method of claim 18, wherein step (2) comprises the step of diverting packets containing digitized audio and video information associated with a video teleconference.

20. The method of claim 18, wherein step (1) comprises the step of using a traffic comparison circuit within the packet switch to detect the high traffic rate, and wherein step (2) comprises the step of issuing a command from the packet switch to a crosspoint matrix to provide the dedicated path.

21. In a packet switching device having a plurality of ports at which packets having routing address information are received and transmitted and a packet switching circuit that routes packets between ports, a method of improving performance comprising the steps of:

(1) using the packet switching circuit to route packets between a port where a packet is received and at least one other port according to the routing address information;

(2) detecting a condition that a high traffic rate exists for the particular routing address information in step (1); and (3) in response to detecting the high traffic rate in step (2), providing a dedicated path for subsequent packets having the particular routing address information, wherein the dedicated path avoids use of the packet switching circuit to route subsequent packets.

22. The method of claim 21, wherein step (2) comprises the step of using a traffic rate comparison circuit within the packet switching circuit to detect high traffic rates.

23. The method of claim 21, wherein step (3) comprises the step of configuring a crosspoint matrix, and two subswitches coupled between the crosspoint matrix and two of the ports, to divert packets through the subswitches to the crosspoint matrix.

24. The method of claim 23, wherein step (3) further comprises the step of using a processor and a subswitch routing table in each of the two subswitches to divert the packets.

\* \* \* \* \*